(12) United States Patent
Chen et al.

(10) Patent No.: US 12,736,929 B2
(45) Date of Patent: Sep. 15, 2026

(54) SYSTEMS AND METHODS FOR MONITORING AND TRAINING A MANUFACTURING SYSTEM

(71) Applicant: Ford Global Technologies, LLC, Dearborn, MI (US)

(72) Inventors: Zhiyi Chen, Ann Arbor, MI (US); Harshal Maske, Farmington Hills, MI (US); Devesh Upadhyay, Canton, MI (US); Huanyi Shui, Ann Arbor, MI (US); Michael Brendan Hopka, Milford, MI (US); Xun Huan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 823 days.

(21) Appl. No.: 18/153,157

(22) Filed: Jan. 11, 2023

(65) Prior Publication Data

US 2024/0231289 A1 Jul. 11, 2024

(51) Int. Cl.
*G05B 13/02* (2006.01)
*G05B 13/04* (2006.01)

(52) U.S. Cl.
CPC ......... *G05B 13/027* (2013.01); *G05B 13/042* (2013.01)

(58) Field of Classification Search
CPC ............ G05B 19/41885; G05B 13/042; G05B 13/027; G06N 3/0455
See application file for complete search history.

(56) References Cited

U.S. PATENT DOCUMENTS

2018/0150052 A1* 5/2018 Cherian ............... G05B 13/027
2021/0081808 A1 3/2021 Stefanescu

FOREIGN PATENT DOCUMENTS

CN 114626302 6/2022

OTHER PUBLICATIONS

Yan, Hao, et al. "Deep multistage multi-task learning for quality prediction of multistage manufacturing systems." Journal of Quality Technology 53.5 (2021): 526-544. (Year: 2021).*

(Continued)

*Primary Examiner* — Schyler S Sanks
(74) *Attorney, Agent, or Firm* — Burris Law, PLLC

(57) ABSTRACT

A method includes generating, by a given autoencoder, a given operational indicator based on sensor data obtained from one or more sensors disposed at a given manufacturing station; selectively aggregating, by the given linear propagator and based on a linear mapping model, the given operational indicator and one or more additional operational indicators associated with one or more additional manufacturing stations to selectively generate an aggregated operational indicator; generating, by the given neural network and in response to generating the aggregated operational indicator, a predicted operational characteristic of the given manufacturing station based on the given operational indicator and the aggregated operational indicator; and determining a state of the manufacturing system based on the predicted operational characteristic and one or more additional predicted operational characteristics generated by one or more additional neural networks from among the plurality of neural networks.

9 Claims, 5 Drawing Sheets

(56) References Cited

OTHER PUBLICATIONS

Shui et al, Twofold Variation Propagation Modeling and Analysis for Roll-to-Roll Manufacturing Systems, Abstract in IEEE Transactions on Automation Science and Engineering, 4 pages, vol. 16(2), Apr. 2019, IEEE.
Yan et al, Deep Multistage Multi-Task Learning for Quality Prediction of Multistage Manufacturing Systems, May 17, 2021, 33 pages, available at https://arxiv.org/abs/2105.08180.

* cited by examiner

SYSTEMS AND METHODS FOR MONITORING AND TRAINING A MANUFACTURING SYSTEM

FIELD

The present disclosure relates to systems and methods for monitoring and training a manufacturing system.

BACKGROUND

The statements in this section merely provide background information related to the present disclosure and may not constitute prior art.

In a manufacturing environment, monitoring routines are performed to verify the accuracy and quality of a workpiece (e.g., a vehicle part) associated with a given step of a manufacturing routines. As an example, operators may perform visual monitoring routines to identify defects, but it may be difficult for an operator to accurately identify the type and cause of a defect when multiple manufacturing stations are provided within the manufacturing environment. As another example, machine learning systems may perform machine learning routines to identify the type and cause of defects, but conventional machine learning systems are often limited to a single manufacturing station and may not include information indicative of a coupling between multiple manufacturing stations. These issues with conventional monitoring routines, among other issues, are addressed by the present disclosure.

SUMMARY

This section provides a general summary of the disclosure and is not a comprehensive disclosure of its full scope or all of its features.

The present disclosure provides a method for monitoring a manufacturing system comprising a plurality of manufacturing stations, a plurality of autoencoders, a plurality of neural networks, and a plurality of linear propagators. The method includes generating, by a given autoencoder from among the plurality of autoencoders, a given operational indicator based on sensor data obtained from one or more sensors disposed at a given manufacturing station from among the plurality of manufacturing stations, where the given autoencoder is associated with a given linear propagator from among the plurality of linear propagators, and where the given autoencoder is associated with a given neural network from among the plurality of neural networks. The method includes selectively aggregating, by the given linear propagator and based on a linear mapping model, the given operational indicator and one or more additional operational indicators associated with one or more additional manufacturing stations from among the plurality of manufacturing stations to selectively generate an aggregated operational indicator. The method includes generating, by the given neural network and in response to generating the aggregated operational indicator, a predicted operational characteristic of the given manufacturing station based on the given operational indicator and the aggregated operational indicator. The method includes determining a state of the manufacturing system based on the predicted operational characteristic and one or more additional predicted operational characteristics generated by one or more additional neural networks from among the plurality of neural networks.

The following paragraph provides variations of the method of the above paragraph, and the variations may be implemented individually or in any combination.

In one form, the method includes generating, by the given neural network and in response to not generating the aggregated operational indicator, the predicted operational characteristic based on the given operational indicator. In one form, selectively aggregating, by the given linear propagator and based on the linear mapping model, the given operational indicator and the one or more additional operational indicators to selectively generate the aggregated operational indicator further comprises: determining whether one or more manufacturing stations from among the plurality of manufacturing stations precedes the given manufacturing station; and aggregating the given operational indicator and the one or more additional operational indicators to selectively generate the aggregated operational indicator in response to the one or more manufacturing stations preceding the given manufacturing station. In one form, the method further includes propagating, by the given linear propagator, the aggregated operational indicator to an additional neural network from among the plurality of neural networks, where the additional neural network is associated with a subsequent manufacturing station from among the plurality of manufacturing stations; and generating, by the additional neural network, an additional predicted operational characteristic based on the aggregated operational indicator and an additional operational indicator associated with the additional neural network. In one form, the given autoencoder is a variational autoencoder. In one form, generating the given operational indicator based on the sensor data further comprises converting, by the given autoencoder, the sensor data into a latent space representation of the sensor data. In one form, the linear mapping model comprises a Koopman operator. In one form, the method further includes selectively adjusting one or more manufacturing routine characteristics of the plurality of manufacturing stations based on the state of the manufacturing system and a backpropagation routine. In one form, the method further includes determining a sensor-based operational characteristic of the given manufacturing station based on the sensor data, and selectively adjusting one or more parameters of the given neural network based on a comparison between the sensor-based operational characteristic and the predicted operational characteristic.

The present disclosure provides a method for training a plurality of autoencoders, a plurality of neural networks, and a plurality of linear propagators disposed in a manufacturing system comprising a plurality of manufacturing stations. The method includes obtaining, by a given autoencoder from among the plurality of autoencoders, autoencoder training data (ATD) from one or more sensors disposed at a given manufacturing station from among the plurality of manufacturing stations. The method includes determining whether the given autoencoder is trained based on a difference between the ATD and replicated ATD. The method includes, in response to a determination that the given autoencoder is trained: generating, by the given autoencoder, a neural network training operational indicators NNTOI based on neural network training data (NNTD) obtained from the one or more sensors; determining a sensor-based operational characteristic based on the NNTD; determining, by the given neural network, a predicted operational characteristic of the given manufacturing station based on the NNTOI and an aggregated operational indicator (AOI) obtained from a given linear propagator from among the plurality of linear propagators; and training the given neural network, the given linear propagator, or a combination thereof based on the predicted operational characteristic and the sensor-based operational characteristic.

The following paragraph provides variations of the method of the above paragraph, and the variations may be implemented individually or in any combination.

In one form, the method further includes training the given autoencoder, where training the given autoencoder further comprises: encoding, by the given autoencoder, the ATD to generate an autoencoder training operational indicator (ATOI) based on the ATD, where the ATOI is based on a latent space representation of the ATD; and decoding, by the given autoencoder, the ATOI to generate the replicated ATD. In one form, the given autoencoder is trained based on a difference between the ATD and the replicated ATD. In one form, the given autoencoder is a variational autoencoder. In one form, the NNTOI is based on a latent space representation of the NNTD. In one form, the method further includes generating the AOI based on a Koopman operator. In one form, training the given neural network further comprises selectively adjusting one or more parameters of the given neural network based on a comparison between the sensor-based operational characteristic and the predicted operational characteristic. In one form, training the given linear propagator further comprises selectively adjusting one or more parameters of the given linear propagator based on a comparison between the sensor-based operational characteristic and the predicted operational characteristic. In one form, the method further includes: connecting the plurality of autoencoders, the plurality of neural networks, and the plurality of linear propagators; determining, by the plurality of neural networks, a plurality of connected predicted operational characteristics based on connected NNTOI generated by the plurality of autoencoders; determining a plurality of connected sensor-based operational characteristics based on connected NNTD associated with the one or more sensors provided at each of the plurality of manufacturing stations; determining a connected loss value based on a comparison between the plurality of connected predicted operational characteristics and the plurality of connected sensor-based operational characteristics; and selectively adjusting one or more parameters of the plurality of neural networks based on the connected loss value. In one form, the method further includes selectively adjusting one or more parameters of the plurality of linear propagators based on the connected loss value.

The present disclosure provides a method for monitoring a manufacturing system comprising a plurality of manufacturing stations, a plurality of autoencoders, a plurality of neural networks, and a plurality of linear propagators. The method includes generating, by a given autoencoder from among the plurality of autoencoders, a given operational indicator based on sensor data obtained from one or more sensors disposed at a given manufacturing station from among the plurality of manufacturing stations, where the given autoencoder is associated with a given linear propagator from among the plurality of linear propagators, where the given autoencoder is associated with a given neural network from among the plurality of neural networks, and where the given autoencoder is a variational autoencoder. The method includes selectively aggregating, by the given linear propagator and based on a linear mapping model, the given operational indicator and one or more additional operational indicators associated with one or more additional manufacturing stations from among the plurality of manufacturing stations to selectively generate an aggregated operational indicator, where the linear mapping model comprises a Koopman operator. The method includes generating, by the given neural network and in response to generating the aggregated operational indicator, a predicted operational characteristic of the given manufacturing station based on the given operational indicator and the aggregated operational indicator. The method includes determining a state of the manufacturing system based on the predicted operational characteristic and one or more additional predicted operational characteristics generated by one or more additional neural networks from among the plurality of neural networks.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
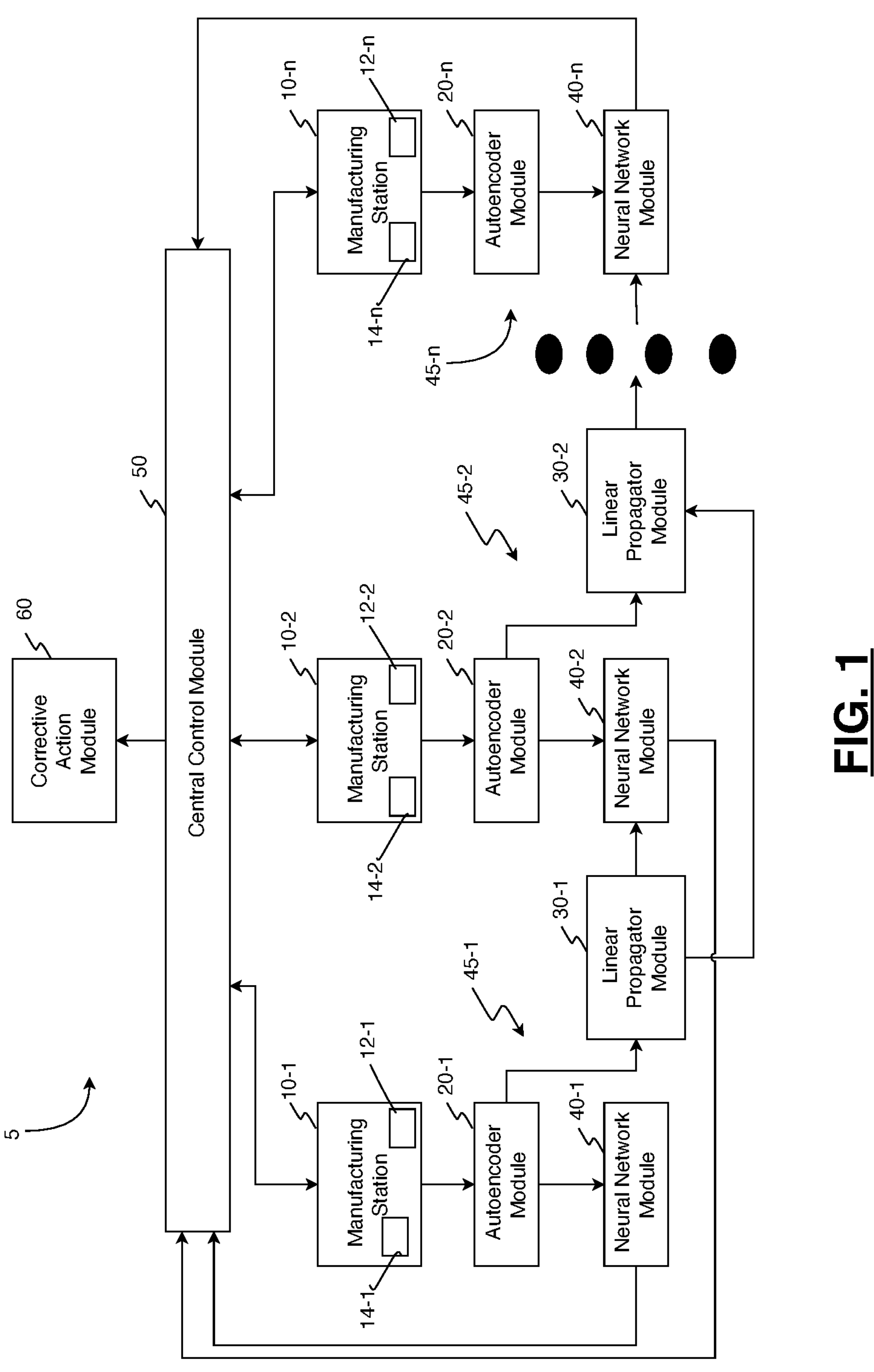
FIG. 1 is a block diagram of a manufacturing system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a method for monitoring a manufacturing system comprising a plurality of manufacturing stations, a plurality of autoencoders, a plurality of neural networks, and a plurality of linear propagators. The method includes generating, by a given autoencoder from among the plurality of autoencoders, a given operational indicator based on sensor data obtained from one or more sensors. The method includes selectively aggregating, by the given linear propagator and based on a linear mapping model, the given operational indicator and one or more additional operational indicators associated with one or more additional manufacturing stations to selectively generate an aggregated operational indicator. The method includes generating, by the given neural network and in response to generating the aggregated operational indicator, a predicted operational characteristic of the given manufacturing station based on the given operational indicator and the aggregated operational indicator. The method includes determining a state of the manufacturing system based on the predicted operational characteristic and one or more additional predicted operational characteristics generated by one or more additional neural networks from among the plurality of neural networks. That is, the present disclosure discloses a method that obtains a linear subspace embedded in a nonlinear manufacturing system by converting nonlinear systems into a linear latent model using autoencoders and linear operators, such as Koopman operators. By performing the method for monitoring the manufacturing system described herein, the complex and nonlinear behavior of manufacturing systems having multiple manufacturing stations are modeled as an equivalent linear system, thereby providing for the identification of manufacturing system issues and bottlenecks and the appropriate corrective action for remedying the respective issue and bottleneck. Additionally, the methods described herein provide for "virtual sensing" to predict a part or process quality deviation when physical sensor/inspection systems are insufficient to provide the requisite indicators of part and/or process quality deviations.

The present disclosure also provides methods for performing online and offline training routines for training the manufacturing system described herein. By performing the online training routine described herein, the neural networks of the manufacturing system may be dynamically tuned to account for unexpected shifts and deviations associated with the manufacturing stations and/or sensor data associated with a component thereof. Furthermore, by performing the offline training routine described herein, a central control module can accurately predict the state of the manufacturing system.

Referring to FIG. 1, a manufacturing system 5 is provided and generally includes manufacturing stations 10-1, 10-2, . . . 10-*n* (collectively referred to herein as "manufacturing stations 10"), autoencoder modules 20-1, 20-2, . . . 20-*n* (collectively referred to herein as "autoencoder modules "20"), linear propagator modules 30-1, 30-2 (collectively referred to herein as "linear propagator modules 30"), neural network modules 40-1, 40-2, . . . 40-*n* (collectively referred to herein as "neural network modules 40"), a central control module 50, and a corrective action module 60. In one form, the manufacturing stations 10, the autoencoder modules 20, the linear propagator modules 30, the neural network modules 40, the central control module 50, and the corrective action module 60 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, a message queuing telemetry transport (MQTT) protocol, among others).

In one form, the manufacturing stations 10 each include components 12-1, 12-2, . . . 12-*n* (collectively referred to herein as "components 12"). In one form, the components 12 include any components that are utilized during a manufacturing routine, such as a routine for making, storing, packaging, and/or distributing a product. As an example, the components 12 may include, but are not limited to: a fixture, a machine, a tool, an inspection system, a robot, a motor, a pump, a tie rod, a programmable logic controller (PLC), and/or a conveyor belt. As a specific example, the components 12-1 include a machine and one or more tools configured to perform a manufacturing transformation on a workpiece. As used herein, a "manufacturing transformation" refers to an automated operation that is performed on a workpiece and may include, but is not limited to: heating the workpiece, removing material from the workpiece, joining the workpiece with another material, among other automated operations. While the components 12 described herein are shown as part of the manufacturing system 5, it should be understood that the components 12 may be other types of components provided within other types of environments, such as equipment provided within a warehouse, packaging/distribution environment, a vehicle, or other types of industrial systems.

In one form, the manufacturing stations 10 include sensors 14-1, 14-2, . . . 14-*n* (collectively referred to herein as "sensors 14") that are configured to generate sensor data that is indicative of one or more operational characteristics of the components 12 and/or the manufacturing station 10. As an example, the sensors 14 may include vibration sensors (e.g., an accelerometer) that generate vibration data of the components 12, such as amplitude data, phase data, coherence data, and/or frequency data. As another example, the sensors 14 may include temperature sensors configured to generate temperature data of the component 12 (e.g., a temperature, heat flux, and/or diffusivity of the components 12) and/or an electrical characteristic sensor configured to generate electrical data of the component 12 (e.g., a voltage, current, power, resistance, impedance, capacitance, and/or inductance of the components 12). As yet another example, the sensors 14 may include a pressure sensor configured to generate pressure data associated with the component (e.g., differential pressure of a pump from among the components 12) and/or a flow rate sensor configured to generate flow rate data (e.g., a mass flow rate of a liquid flowing through a coolant line from among the components 12). It should be understood that the sensors 14 may include various types of sensors and are not limited to the examples described herein. Additionally, it should be understood that process parameters of the manufacturing stations 10 may replace or supplement the sensor data, such as a tool speed, conveyor speed, welder power, proportional-integral-derivative (PID) parameters of a controller, sequence times, among other process parameters.

In one form, a total number of manufacturing stations 10, the autoencoder modules 20, and the neural network modules 40 is n, and a total number of the linear propagator modules 30 is n−1. The autoencoder module 20-1, the linear propagator module 30-1, and the neural network module 40-1 may be collectively referred to hereinafter as "system 45-1." The autoencoder module 20-2, the linear propagator module 30-2, and the neural network module 40-2 may be collectively referred to hereinafter as "system 45-2." The autoencoder module 20-*n* and the neural network module 40-*n* may be collectively referred to hereinafter as "system 45-*n*."

The System 45-1

In one form, the autoencoder module 20-1 is configured to generate a plurality of operational indicators based on the sensor data generated by the one or more sensors 14-1. In one form, the autoencoder module 20-1 converts the sensor data into a latent space representation of the sensor data (as the plurality of operational indicators). To perform the functionality described herein, the autoencoder module 20-1 may be a variational autoencoder having one or more neural network layers (e.g., long short-term memory (LSTM) layers, gated recurrent unit (GRU) layers, among other layers), an encoder layer, and a decoder layer that collectively map the sensor data into the latent space representation. It should be understood that other types of autoencoders may be employed in other variations and is not limited to the example described herein.

As an example, the autoencoder module 20-1 is a variational autoencoder that determines the latent space representation ($\hat{H}_{20\_1}$) based on relation (1) shown below, where $X_{20\_1}$ corresponds to an n-dimensional representation of the sensor data generated by the one or more sensors 14-1, and $\phi_{20\_1}$ corresponds to encoding routine performed by the encoder layer of the autoencoder module 20-1 (e.g., a one-hot encoding routine or other known encoding routines).

$$\hat{H}_{20\_1} = \phi_{20\_1}(X_{20\_1}) \tag{1}$$

In one form, the encoder layer of the autoencoder module 20-1 is trained by the decoder layer of the autoencoder module 20-1 to improve the accuracy of the latent space representation. As an example, the decoder layer determines a regularization value ($\mathcal{L}_{RV,20\_1}$) based on n samples of the sensor data, as shown below in relations (2)-(3). Moreover, $\hat{X}_{20\_1}$ corresponds to reconstructed sensor data, which is based on a combination of the decoding routine performed by the autoencoder module 20-1 ($\psi_{20\_1}$) and the latent space representation ($\hat{H}_{20\_1}$), and $X_{20\_1}$ corresponds to the sensor data generated by the sensor 14-1.

$$\hat{X}_{20\_1} = \psi_{20\_1} \circ \hat{H}_{20\_1} \tag{2}$$

$$\mathcal{L}_{RV,20\_1} = \frac{1}{n}\sum_{i=1}^{n}\left\|\left(X_{20\_1} - \hat{X}_{20\_1}\right)_i\right\|_2^2 \tag{3}$$

In one form, the autoencoder module 20-1 further includes a Gaussian layer that is configured to map the latent state representation as Gaussian latent state variables to accurately account for random variations in the manufacturing routine of the manufacturing system 5. As an example, the Gaussian layer may be configured to determine a temporal means value and a vector of temporal variance value (as the Gaussian state latent variables) using known Gaussian distribution routines.

In one form, the linear propagator module 30-1 is configured to selectively generate an aggregated operational indicator. As an example, when the linear propagator module 30-1 is associated with a first/furthest upstream manufacturing station 10-1 (i.e., there are no preceding manufacturing stations 10 relative to manufacturing station 10-1), the linear propagator module 30-1 may merely provide the latent space representation ($\hat{H}_{20\_1}$) to the neural network module 40-2 due to the absence of upstream manufacturing stations 10. Additional details regarding the aggregated operational indicator are provided below In one form, the neural network module 40-1 determines a predicted operational characteristic of the manufacturing station 10-1 based on the plurality of operational indicators (e.g., the latent space representation ($\hat{H}_{20\_1}$)). As an example, the neural network module 40-1 includes a multilayer perceptron network (MPN) that generates the predicted operational characteristic of the manufacturing station 10-1 by performing known MPN routines based on a difference between a predicted operational characteristic of the component 12-1 (as indicated by the latent space representation ($\hat{H}_{20\_1}$)) and a reference predicted operational characteristic of the component 12-1. The predicted operational characteristic of the manufacturing station 10-1 may indicate a temperature, heat flux, diffusivity, voltage, current, power, resistance, impedance, capacitance, inductance, pressure, mass flow rate, part quality, part defect, tolerance deviation, manufacturing process anomaly, and/or other operational characteristics of the component 12-1. In one form, the neural network module 40-1 provides the predicted operational characteristic to the central control module 50 for further processing, as described below in further detail. It should be understood that the neural network module 40-1 may include various types of neural networks and is not limited to the example described herein.

The Systems 45-2, **45-*n***

The autoencoder modules 20-2, **20-*n* are configured to generate the plurality of operational indicators associated with manufacturing stations 10-2, 10-*n*, respectively, in a similar manner as the autoencoder module 20-1 (e.g., latent space representations $\hat{H}_{20_2}$ and $\hat{H}_{20\_n}$ associated with manufacturing stations 10-2, 10-*n***, respectively). Accordingly, the description thereof is omitted for brevity.

The linear propagator module 30-2 is similar to the linear propagator module 30-1, except that the linear propagator module 30-2 aggregates operational indicators generated by the autoencoder modules 20-1, 20-2 to generate the aggregated operational indicator. Furthermore, the linear propagator module 30-2 propagates the aggregated operational indicators to the neural network module **40-*n*. As an example, the linear propagator module 30-2 is associated with the second manufacturing station 10-2 and performs the aggregation routine based on the presence of an upstream manufacturing station (e.g., the manufacturing station 10-1**).

In one form, the linear propagator module 30-2 aggregates operational indicators generated by the autoencoder modules 20-1, 20-2 based on a linear mapping model. As an example, the linear mapping model is a Koopman operator that induces a linear aggregation of the latent space representations $\hat{H}_{20\_1}$ and $\hat{H}_{20_2}$. Specifically, the linear propagator module 30-2 generates the aggregated operational indicator ($H_{20\_2}$) by designating the preceding latent space representation ($\hat{H}_{20\_1}$) as an eigenfunction input of the Koopman operator, as shown below in relation (4).

$$H_{20\_2} = \hat{H}_{20\_2} + \mathcal{K}_{20\_1}(\hat{H}_{20\_1}) \tag{4}$$

In relation (4), $\mathcal{K}$ corresponds to a Koopman matrix, such as a diagonal Koopman matrix that constrains a decoupled propagation between consecutive manufacturing stations 10-1, 10-2. Accordingly, by employing the Koopman operator, the latent space representation of the sensor data is an invariant subspace representation of a nonlinear system that increases the dimensionality of the sensor data as opposed to reducing the dimensions of the sensor data. Furthermore, by decoupling the operational indicators among consecutive manufacturing stations 10-1, 10-2, the evolution of changes among the operational indicators is readily identifiable and addressed by the central control module 50 and the corrective action module 60, respectively.

In one form, the neural network module 40-2 is similar to the neural network module 40-1, except that the neural network module 40-2 determines the predicted operational characteristic of the manufacturing station 10-2 based on the operational indicator generated by the autoencoder module 20-2 and the output propagated by the linear propagator module 30-1 (e.g., the latent space representation ($\hat{H}_{20\_1}$)). The neural network module **40-*n* is similar to the neural network module 40-2, except that the neural network module 40-***n* determines the predicted operational characteristic of the manufacturing station 10-*n* based on the operational indicator generated by the autoencoder module 20-*n* and the aggregated operational indicator propagated by each of the preceding or upstream linear propagator modules 30 (e.g., the aggregated operational indicator ($H_{20\_2}$)).

In one form, the central control module 50 is configured to determine a state of the manufacturing system 5 based on the predicted operational characteristics generated by the neural network modules 50. As an example, the central control module 50 may determine that the manufacturing system 5 is operating in a "nominal state" in response to the predicted operational characteristic(s) associated with a given manufacturing station and/or a subsequent manufacturing station relative to the given manufacturing station corresponding to a nominal operational characteristic(s). As another example, the central control module 50 may determine that the manufacturing system 5 is operating in an "anomalous state" in response to the predicted operational characteristic(s) associated with the given manufacturing station and/or the subsequent manufacturing station not corresponding to the nominal operational characteristic(s). To perform the functionality described herein, the central control module 50 may include a neural network that is configured to identify the deviations between the nominal and predicted operational characteristics, which may be predefined in some forms. As an example, the neural network may be provided by a meta-learning model that selectively combines the predicted operational characteristics (i.e., "stacks") of the given manufacturing stations to generate a refined prediction corresponding to the state of the manufacturing system 5. That is, the meta-learning model may perform a k-fold cross-validation routine to stack the predicted operational characteristics, where "k" is equal to the sum of the number of the given manufacturing station and the subsequent manufacturing stations.

In one form, the central control module 50 is configured to train the neural networks 40 by performing an offline training routine and an online training routine. Additional details regarding the online and offline training routine are provided below with reference to FIGS. 3 and 4A-4B, respectively.

In one form, the corrective action module 60 is configured to perform one or more corrective actions based on the state of the manufacturing system 5. As an example, the corrective action includes adjusting one or more manufacturing routine characteristics of the plurality of manufacturing stations based on at least one of a backpropagation routine and an inverse mapping routine. Adjusting the manufacturing routine characteristics includes, but is not limited to, adjusting one or more operational setpoints, sequences, cycle times, and/or physical configurations of a workspace associated with the manufacturing transformation.

As an example, the corrective action module 60 may instruct the linear propagator modules 30 to perform a backpropagation routine and the linear network modules 40 to perform an inverse mapping routine to collectively determine operational indicator sensitivity values (hereinafter referred to as the "sensitivity values"). In one form, higher sensitivity values are associated with operational indicator values that are adjustable by the corrective action module 60. As a more specific example, the linear propagator modules 30 to perform a backpropagation routine and the linear network modules 40 to perform an inverse mapping routine to determine that the linear propagator module 30-2 and the neural network module 40-2 output a sensitivity value indicating a physical characteristic of a product is outside of a predefined dimensional tolerance at the given manufacturing station 10-1. Accordingly, in one form, the corrective action module 60 may instruct one or more downstream manufacturing stations 10 to adjust one or more sequences and manufacturing transformations to be performed to address the physical characteristic of the given product. In one variation, the corrective action module 60 may instruct one or more upstream manufacturing stations 10 to adjust one or more sequences and manufacturing transformations to be performed to address the physical characteristic of the product for future products as opposed to the given product.

As another example, the corrective action includes broadcasting an alarm, an alert, and/or a notification based on the state of the manufacturing system 5. As an example, the corrective action module 60 may instruct an external or remote computing device (e.g., a visual display device, an audio device, a human machine interface (HMI), and/or a tactile feedback device provided within the manufacturing system 5) to output an alarm in response to the state of the manufacturing system 5 indicating that an adjustment to the one or more manufacturing routine characteristics is needed.

Figure 2:
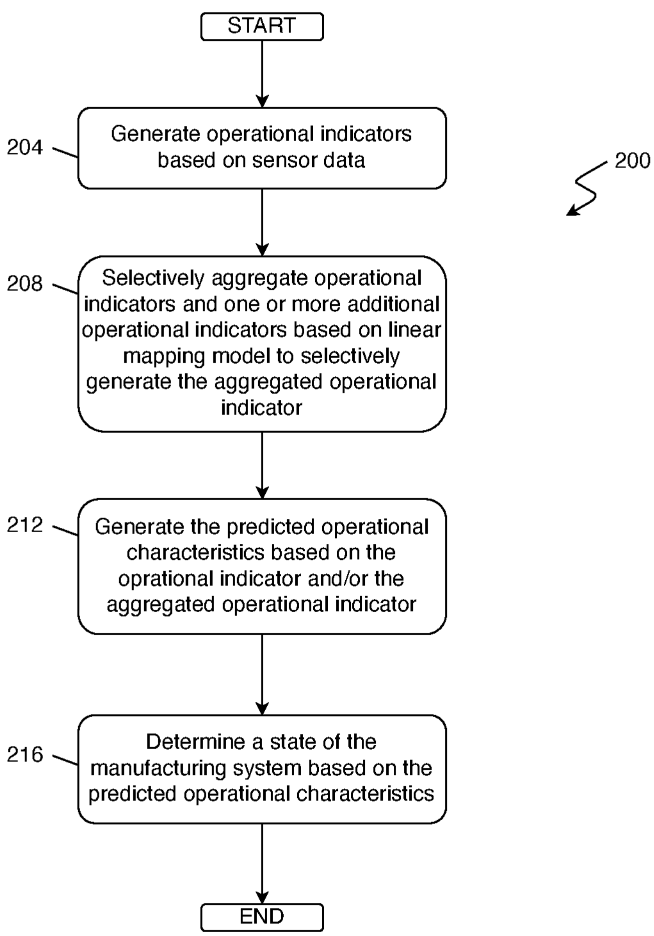
FIG. 2 is a flowchart illustrating an example routine for monitoring a manufacturing system comprising a plurality of manufacturing stations, a plurality of autoencoders, a plurality of neural networks, and a plurality of linear propagators in accordance with the teachings of the present disclosure.

Referring to FIG. 2, a flowchart illustrating an example routine 200 for monitoring the manufacturing system 5 is shown. At 204, the autoencoder modules 20 generate an operational indicator based on the sensor data obtained from one or more sensors 14 disposed at the given manufacturing station 10. At 208, the linear propagator modules 30 selectively aggregate, based on the linear mapping model (e.g., the Koopman operator), the operational indicator and one or more additional operational indicators associated with one or more additional manufacturing stations 10 to selectively generate the aggregated operational indicator. That is, the linear propagator module 30-1 does not perform the aggregation routine, as there are no manufacturing stations 10 that precede the manufacturing station 10-1. Furthermore, the linear propagator module 30-2 performs the aggregation routine to generate the aggregated operational indicator, as the manufacturing station 10-1 precedes the manufacturing station 10-2.

At 212, the neural network modules 40 generate the predicted operational characteristics. As an example, the neural network module 40-1 generates the respective predicted operational characteristic based on the operational indicator generated by the autoencoder module 20-1. As another example, the neural network module 40-2 generates the respective predicted operational characteristic based on the operational indicator generated by the autoencoder module 20-2 and the latent state representation propagated by linear propagator module 30-1. As yet another example, the neural network module 40-*n* generates the respective predicted operational characteristic based on the operational indicator generated by the autoencoder module 20-*n* and the aggregated operational indicator propagated by linear propagator module 30-2. At 216, the central control module 50 determines the state of the manufacturing system 5 based on the predicted operational characteristics generated by the neural network modules 40.

Figure 3:
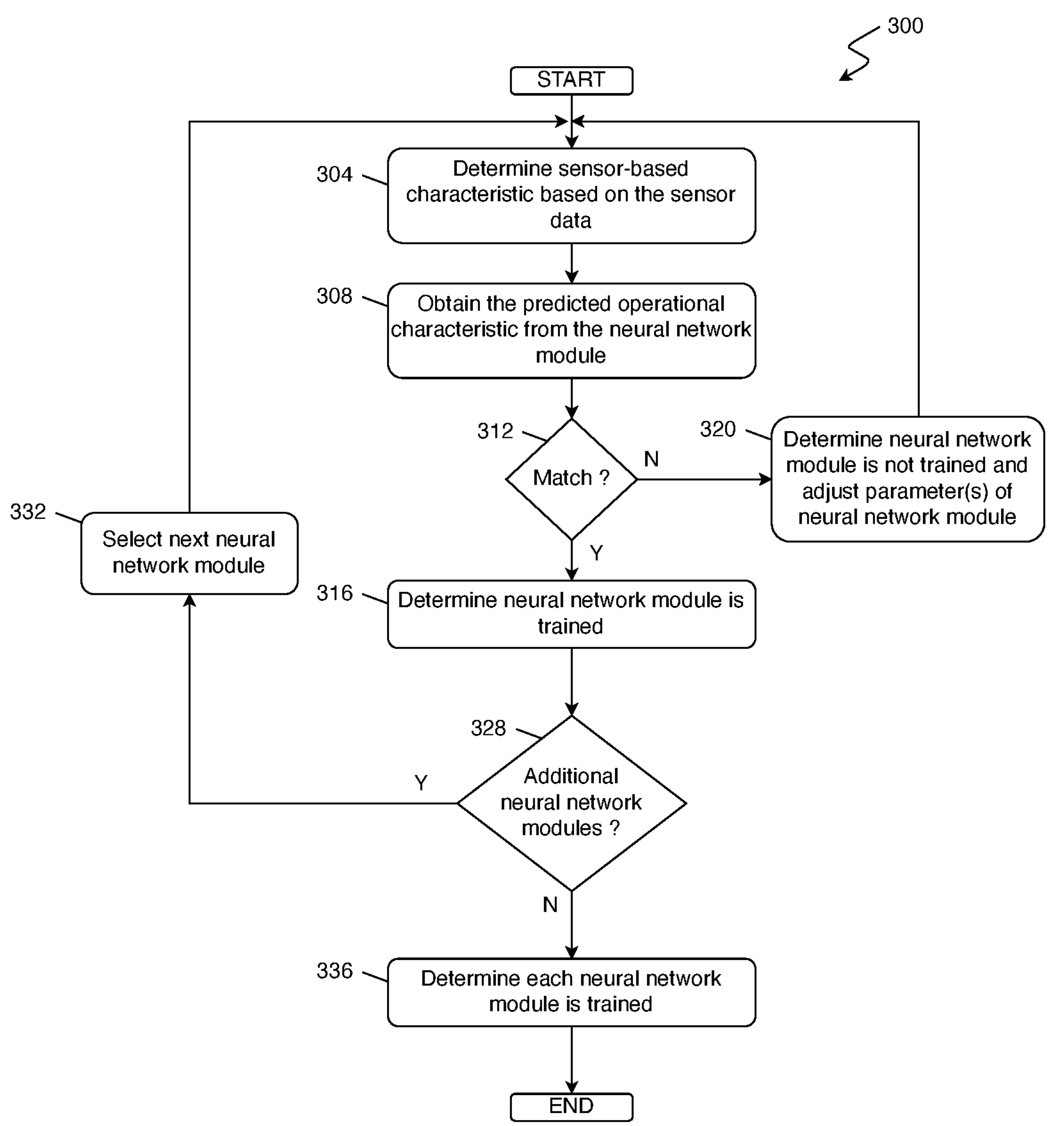
FIG. 3 is a flowchart illustrating an online training routine for training a plurality of neural networks in accordance with the teachings of the present disclosure.

Referring to FIG. 3, a flowchart illustrating an example online training routine 300 for training the neural network modules 40 is shown. In one form, the online training routine 300 is performed when the manufacturing system 5 is deployed and after the offline training routine is performed, which is described below in further detail with reference to FIGS. 4A-4B.

At 304, the central control module 50 determines a sensor-based characteristic of a given manufacturing station 10 based on the sensor data. As an example, the sensor-based characteristic may be indicative of the raw sensor data generated by the one or more sensors 14 of the given manufacturing station 10. At 308, the central control module 50 obtains the predicted operational characteristic from the given neural network module 40 and determines whether the predicted operational characteristic and the sensor-based characteristic match at 312. If the predicted operational characteristic and the sensor-based characteristic match, the routine 300 proceeds to 316, where the central control module 50 determines that the neural network module 40 is trained and then proceeds to 324.

If the predicted operational characteristic and the sensor-based characteristic do not match, the routine 300 proceeds to 320, where the central control module 50 determines that neural network module 40 is not trained and adjusts one or more parameters of the neural network module 40, such as a weight and/or arrangement of one or more layers of the neural network module 40. At 328, the central control module 50 determines whether there are additional neural network modules 40 that need to be trained. If so, the routine 300 proceeds to 332 and selects the next neural network module 40. Otherwise, the routine 300 proceeds to 336 and determines that each neural network module 40 is trained and then ends.

Figure 4A:
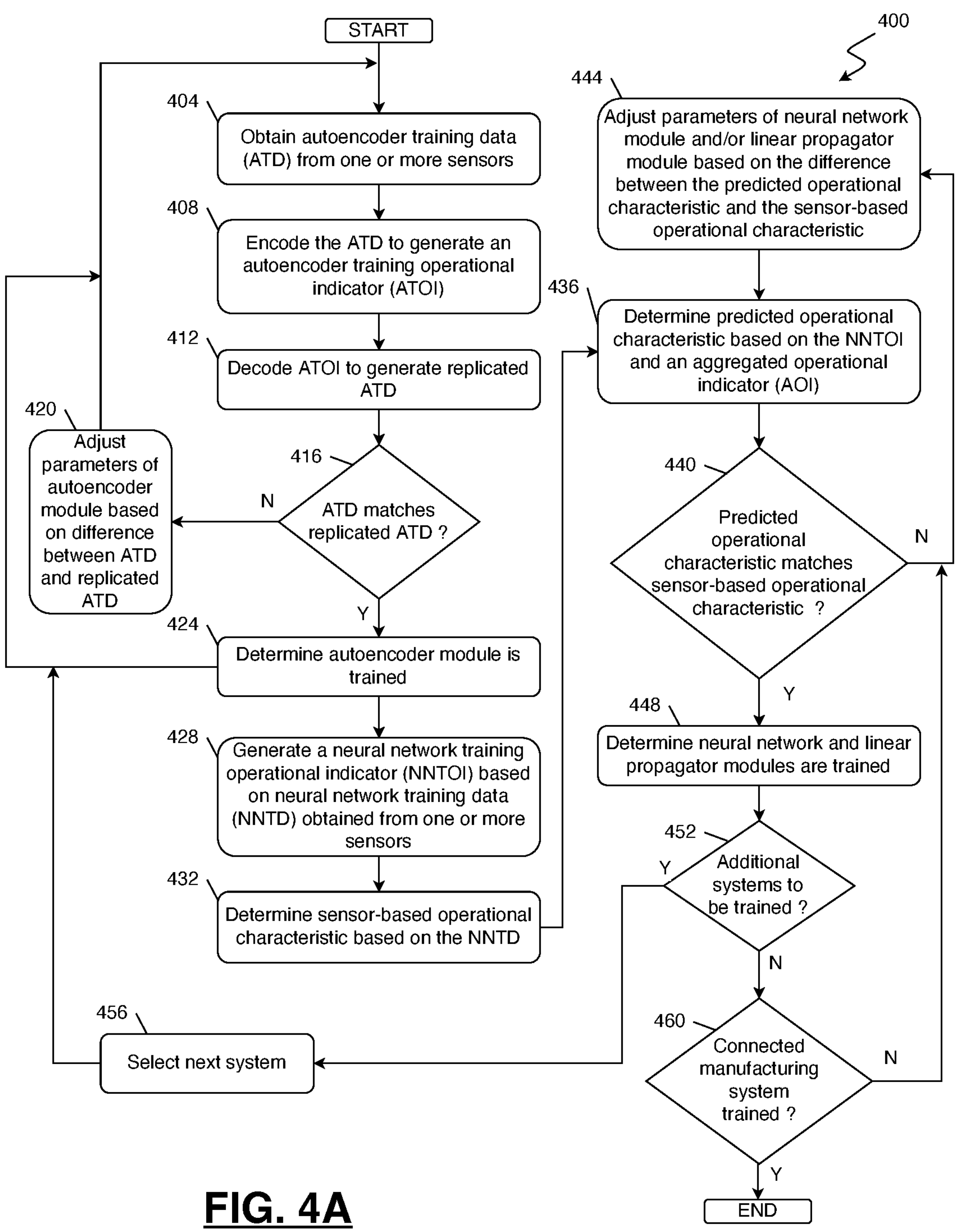
FIG. 4A is a flowchart illustrating an offline training routine for training a plurality of neural networks in accordance with the teachings of the present disclosure.
Figure 4B:
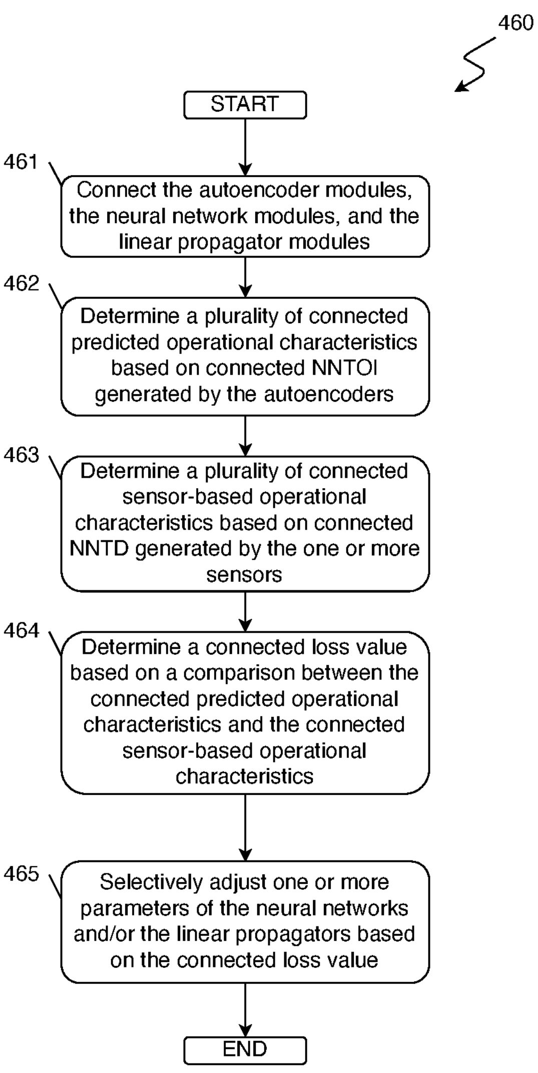
FIG. 4B is a flowchart illustrating a routine for determining whether a connected manufacturing system is trained in accordance with the teachings of the present disclosure.

Referring to FIG. 4A, a flowchart illustrating an example offline training routine 400 for training the manufacturing system 5 is shown. In one form, the offline training routine 400 is performed prior to deploying the manufacturing system 5.

At 404, an autoencoder module 20 obtains autoencoder training data (ATD) from one or more sensors 14 disposed at a given manufacturing station 10. As an example, the ATD may correspond to actual or simulated sensor data associated with the one or more sensors 14. At 408, the autoencoder module 20 encodes the ATD to generate an autoencoder training operational indicator (ATOI). In one form, the ATOI is a latent space representation of the ATD and is generated in a similar manner as described above. At 412, the autoencoder module 20 decodes the ATOI to generate replicated ATD. At 416, the central control module 50 determines whether the ATD matches the replicated ATD and therefore determines whether the given autoencoder module 20 is trained based on the difference between the replicated ATD and the ATD. If so, the routine 400 proceeds to 424, where the central control module 50 determines that the autoencoder module 20 is trained. Otherwise, the routine 400 proceeds to 420, where the central control module 50 adjusts one or more parameters of the autoencoder module 20 (e.g., a code size, number of layers, one or more weights, and/or a number of nodes per layer of the autoencoder module 20) and then proceeds to 404. Accordingly, the autoencoder module 20 and the central control module 50 may collectively perform an unsupervised learning routine to train the autoencoder module 20.

At 428, the autoencoder module 20 generates a neural network training operational indicator (NNTOI) based on neural network training data (NNTD) obtained from the one or more sensors 14. In one form, the NNTOI is a latent space representation of the NNTD. As an example, the NNTD may correspond to actual sensor data generated by the one or more sensors 14 while simulating the manufacturing transformation performed by the manufacturing station 10. At 432, the central control module 50 determines the sensor-based operational characteristic based on the NNTD, and the neural network module 40 determines the predicted operational characteristic based on the NNTOI and an aggregated operational indicator (AOI). As an example, and as described above, the AOI may be generated based on a Koopman operator. It should be understood that the neural network module 40 may not determine the predicted operational characteristic based on the AOI when no preceding manufacturing stations 10 are present relative to the given manufacturing station 10.

At 440, the central control module 50 determines whether the predicted operational characteristic and the sensor-based characteristic match. If the predicted operational characteristic and the sensor-based characteristic match, the routine 400 proceeds to 448, where the central control module 50 determines that the neural network module 40 and the linear propagator modules 30 are trained and then proceeds to 452. If the predicted operational characteristic and the sensor-based characteristic do not match at 440, the routine 400 proceeds to 444, where the central control module 50 determines that neural network module 40 is not trained and adjusts one or more parameters of the neural network module 40 and/or the linear propagator module 30 based on the difference (e.g., the central control module 50 adjusts a weight of one or more layers of the neural network module 40). At 452, the central control module 50 determines whether there are additional systems 45 that need to be trained. If so, the routine 400 proceeds to 456, where the central control module 50 selects the next system 45 and then proceeds to 404. Otherwise, the routine 400 proceeds to 460.

At 460, the central control module 50 determines whether the connected manufacturing system 5 is trained. That is, at 460, the central control module 50 determines whether the systems 45-1, 45-2, 45-*n* are sufficiently trained when they are connected to form a complete network model. As an example, and referring to FIG. 4B, to determine whether the connected manufacturing system 5 is trained, the central control module 50 connects/couples the autoencoder modules 20, the neural network modules 40, and the linear propagator modules 30 to form a connected model at 461. At 462, each of the neural network modules 40 determine a connected predicted operational characteristic (i.e., the predicted operational characteristic when the manufacturing system 5 forms a connected model) based on connected NNTOI generated by the autoencoder modules 20 (i.e., the NNTOI when the manufacturing system 5 forms a connected model). At 463, the central control module 50 determines a plurality of connected sensor-based operational characteristics associated with each of the one or more sensors 14 (i.e., the sensor-based characteristics when the manufacturing system 5 forms a connected model).

At 464, the central control module 50 determines a connected loss value based on a comparison between the plurality of connected predicted operational characteristics and the plurality of connected sensor-based operational characteristics. As an example, the connected loss value may be based on a sum of the loss values of each of the neural networks 40 when the manufacturing system 5 forms the connected model. At 465, the central control module 50 selectively adjusts one or more parameters of the neural network modules 40 and/or the linear propagator modules 30 based on the connected loss value. As an example, if the connected loss value is less than a threshold value, the central control module 50 refrains from adjusting the parameters of the neural network modules 40 and/or the linear propagator modules 30 and determines that the connected manufacturing system 5 is sufficiently trained. As another example, if the connected loss value is greater than a threshold value, the central control module 50 adjusts the parameters of the neural network modules 40 and/or the linear propagator modules 30 in a similar manner as step 444 and iteratively repeats steps 461-465 until the connected manufacturing system 5 is trained.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for monitoring a manufacturing system comprising a plurality of manufacturing stations, a plurality of autoencoders, a plurality of neural networks, and a plurality of linear propagators, the method comprising:

generating, by a given autoencoder from among the plurality of autoencoders, a given operational indicator based on sensor data obtained from one or more sensors disposed at a given manufacturing station from among the plurality of manufacturing stations, wherein the given autoencoder is associated with a given linear propagator from among the plurality of linear propagators, and wherein the given autoencoder is associated with a given neural network from among the plurality of neural networks;

selectively aggregating, by the given linear propagator and based on a linear mapping model, the given operational indicator and one or more additional operational indicators associated with one or more additional manufacturing stations from among the plurality of manufacturing stations to selectively generate an aggregated operational indicator;

generating, by the given neural network and in response to generating the aggregated operational indicator, a predicted operational characteristic of the given manufacturing station based on the given operational indicator and the aggregated operational indicator;

determining a state of the manufacturing system based on the predicted operational characteristic and one or more additional predicted operational characteristics generated by one or more additional neural networks from among the plurality of neural networks; and selectively adjusting at least one of an operational set point, an operational sequence, a cycle time, and a physical configuration of the plurality of manufacturing stations based on the state of the manufacturing system.

2. The method of claim 1 further comprising generating, by the given neural network and in response to not generating the aggregated operational indicator, the predicted operational characteristic based on the given operational indicator.

3. The method of claim 1, wherein selectively aggregating, by the given linear propagator and based on the linear mapping model, the given operational indicator and the one or more additional operational indicators to selectively generate the aggregated operational indicator further comprises:

determining whether one or more manufacturing stations from among the plurality of manufacturing stations precedes the given manufacturing station; and aggregating the given operational indicator and the one or more additional operational indicators to selectively generate the aggregated operational indicator in response to the one or more manufacturing stations preceding the given manufacturing station.

4. The method of claim 1 further comprising:

propagating, by the given linear propagator, the aggregated operational indicator to an additional neural network from among the plurality of neural networks, wherein the additional neural network is associated with a subsequent manufacturing station from among the plurality of manufacturing stations; and generating, by the additional neural network, an additional predicted operational characteristic based on the aggregated operational indicator and an additional operational indicator associated with the additional neural network.

5. The method of claim 1, wherein the given autoencoder is a variational autoencoder.

6. The method of claim 1, wherein generating the given operational indicator based on the sensor data further comprises converting, by the given autoencoder, the sensor data into a latent space representation of the sensor data.

7. The method of claim 1, wherein the linear mapping model comprises a Koopman operator.

8. The method of claim 1 further comprising:

determining a sensor-based operational characteristic of the given manufacturing station based on the sensor data; and selectively adjusting one or more parameters of the given neural network based on a comparison between the sensor-based operational characteristic and the predicted operational characteristic.

9. A method for monitoring a manufacturing system comprising a plurality of manufacturing stations, a plurality of autoencoders, a plurality of neural networks, and a plurality of linear propagators, the method comprising:

generating, by a given autoencoder from among the plurality of autoencoders, a given operational indicator based on sensor data obtained from one or more sensors disposed at a given manufacturing station from among the plurality of manufacturing stations, wherein the given autoencoder is associated with a given linear propagator from among the plurality of linear propagators, wherein the given autoencoder is associated with a given neural network from among the plurality of neural networks, and wherein the given autoencoder is a variational autoencoder;

selectively aggregating, by the given linear propagator and based on a linear mapping model, the given operational indicator and one or more additional operational indicators associated with one or more additional manufacturing stations from among the plurality of manufacturing stations to selectively generate an aggregated operational indicator, wherein the linear mapping model comprises a Koopman operator;

generating, by the given neural network and in response to generating the aggregated operational indicator, a predicted operational characteristic of the given manufacturing station based on the given operational indicator and the aggregated operational indicator;

determining a state of the manufacturing system based on the predicted operational characteristic and one or more additional predicted operational characteristics generated by one or more additional neural networks from among the plurality of neural networks; and selectively adjusting at least one of an operational set point, an operational sequence, a cycle time, and a physical configuration of the plurality of manufacturing stations based on the state of the manufacturing system.

* * * * *